(12) United States Patent
Maeda et al.

(10) Patent No.: US 11,260,906 B2
(45) Date of Patent: Mar. 1, 2022

(54) EXCAVATOR AND METHOD OF CONTROLLING EXCAVATOR

(71) Applicant: SUMITOMO CONSTRUCTION MACHINERY CO., LTD., Tokyo (JP)

(72) Inventors: Norio Maeda, Chiba (JP); Masaki Makino, Chiba (JP); Takumi Tanaka, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 207 days.

(21) Appl. No.: 16/727,237

(22) Filed: Dec. 26, 2019

(65) Prior Publication Data

US 2020/0131734 A1  Apr. 30, 2020

Related U.S. Application Data

(63) Continuation of application No. PCT/JP2018/024810, filed on Jun. 29, 2018.

(30) Foreign Application Priority Data

Jul. 5, 2017  (JP) .............................. JP2017-132031

(51) Int. Cl.
  *B62D 11/04*  (2006.01)
  *E02F 9/20*  (2006.01)
  *E02F 9/22*  (2006.01)

(52) U.S. Cl.
  CPC ............ *B62D 11/04* (2013.01); *E02F 9/2087* (2013.01); *E02F 9/225* (2013.01)

(58) Field of Classification Search
  CPC ............................... B62D 11/04; E02F 9/2087
  See application file for complete search history.

(56) References Cited

FOREIGN PATENT DOCUMENTS

| JP | 2004-340259 | | 12/2004 | |
|----|-------------|---|---------|---|
| JP | 2005-121074 | | 5/2005 | |
| JP | 2008-248981 | | 10/2008 | |
| JP | 2008246734 | A * | 10/2008 | |
| JP | 2010-178630 | | 8/2010 | |
| JP | 2021038698 | A * | 3/2021 | |
| WO | WO-2019064715 | A1 * | 4/2019 | ............ F15B 11/028 |

OTHER PUBLICATIONS

International Search Report for PCT/JP2018/024810 dated Sep. 18, 2018.

* cited by examiner

*Primary Examiner* — Kevin Hurley
(74) *Attorney, Agent, or Firm* — IPUSA, PLLC (57) ABSTRACT

An excavator includes a lower travelling body; an upper turning body mounted on the lower travelling body; a hydraulic pump installed in the upper turning body; a travelling hydraulic motor that is a variable displacement type motor configured to move the lower travelling body by being driven by hydraulic oil discharged by the hydraulic pump; and a control device configured to control a motor capacity of the travelling hydraulic motor so as to be switchable between a plurality of levels. The control device switches the motor capacity to a low rotation setting upon detecting that an operation for changing a travelling direction of the lower travelling body is performed.

8 Claims, 10 Drawing Sheets

EXCAVATOR AND METHOD OF CONTROLLING EXCAVATOR

CROSS-REFERENCE TO RELATED APPLICATION

The present application is a continuation of International Application No. PCT/JP2018/024810 filed on Jun. 29, 2018, which is based on and claims priority to Japanese Patent Application No. 2017-132031, filed on Jul. 5, 2017. The contents of these applications are incorporated herein by reference in their entirety.

BACKGROUND OF THE INVENTION

1. Field of the Invention

The present invention relates to an excavator equipped with a variable displacement type travelling hydraulic motor and a method of controlling the excavator.

2. Description of the Related Art

Conventionally, an excavator equipped with a variable displacement type travelling hydraulic motor is known. The travelling hydraulic motor operates in either one of two travelling modes, i.e., a one-speed mode in which the displacement capacity per rotation (hereinafter, referred to as the "motor capacity") is relatively large or a two-speed mode in which the motor capacity is relatively small. When a spin-turn operation (ultra-pivotal turn) is performed, the excavator forcibly switches the travelling mode to the one-speed mode. This is to facilitate the spin-turn.

SUMMARY OF THE INVENTION

According to one aspect of the present invention, there is provided an excavator including a lower travelling body; an upper turning body mounted on the lower travelling body; a hydraulic pump installed in the upper turning body; a travelling hydraulic motor that is a variable displacement type motor configured to move the lower travelling body by being driven by hydraulic oil discharged by the hydraulic pump; and a control device configured to control a motor capacity of the travelling hydraulic motor so as to be switchable between a plurality of levels, wherein the control device switches the motor capacity to a low rotation setting upon detecting that an operation for changing a travelling direction of the lower travelling body is performed.

DETAILED DESCRIPTION OF THE PREFERRED EMBODIMENTS

In the related art described above, when an operation is performed to change the travelling direction while rotating the right and left crawler tracks in the same direction, the above-described excavator does not forcibly switch the travelling mode to the one-speed mode. Therefore, there is a risk that the travelling mode is frequently switched between the one-speed mode and the two-speed mode depending on the travelling load.

In view of the above, it is desirable to provide an excavator that causes the variable displacement type travelling hydraulic motor to operate more stably.

Figure 1:
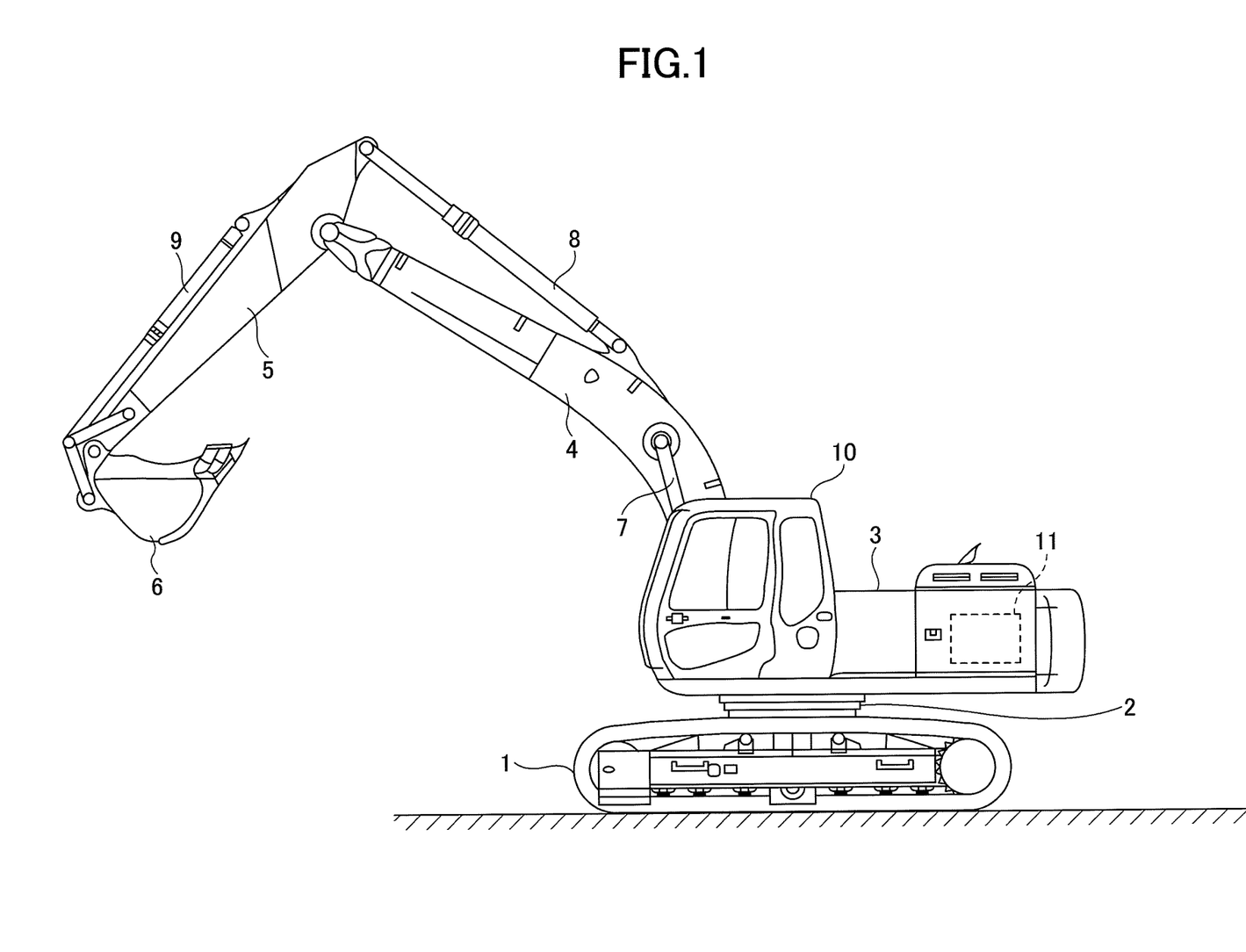
FIG. 1 is a side view of an excavator according to an embodiment of the present invention.

First, an excavator (mechanical shovel) as a construction machine according to an embodiment of the present invention will be described with reference to FIG. 1. FIG. 1 is a side view of the excavator. On a lower travelling body 1 of the excavator illustrated in FIG. 1, an upper turning body 3 is mounted via a turning mechanism 2. To the upper turning body 3, a boom 4 as a working element is attached. To the tip of the boom 4, an arm 5 as a working element is attached. To the tip of the arm 5, a bucket 6 as a working element and an end attachment is attached. The boom 4 is driven by a boom cylinder 7. The arm 5 is driven by an arm cylinder 8. The bucket 6 is driven by a bucket cylinder 9. The upper turning body 3 is provided with a cabin 10 and is equipped with a power source such as an engine 11.

Figure 2:
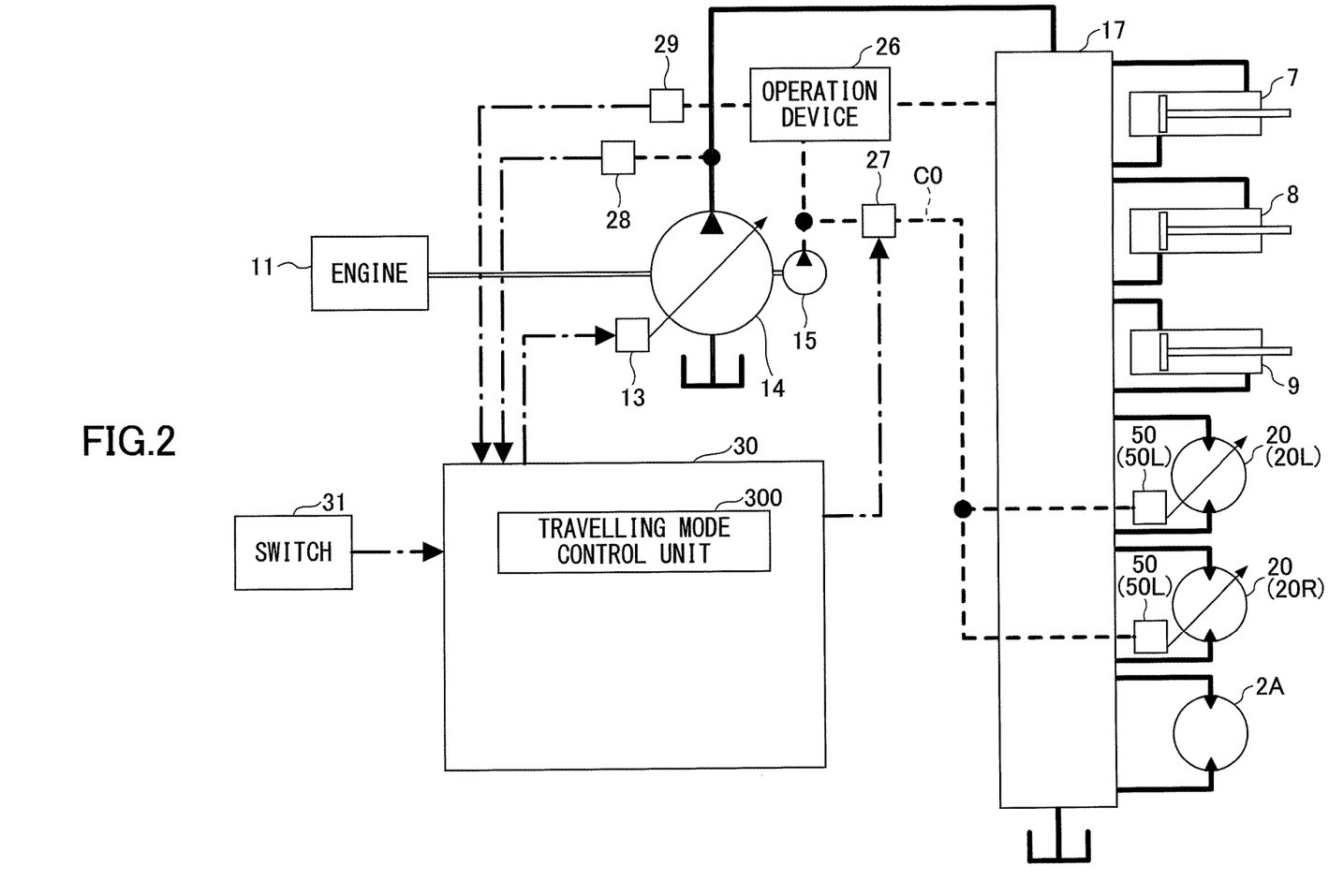
FIG. 2 is a diagram illustrating an example of a configuration of a basic system of the excavator of FIG. 1.

FIG. 2 is a diagram illustrating an example of a configuration of the basic system of the excavator of FIG. 1. In FIG. 2, a mechanical power transmission line, a hydraulic oil line, a pilot line, and an electrical control line are illustrated by a double line, a solid line, a dashed line, and a dash-dot-dash line, respectively. The same applies to FIGS. 3, 4, and 6A to 6C.

The basic system of the excavator mainly includes the engine 11, a pump regulator 13, a main pump 14, a control pump 15, a control valve 17, an operation device 26, a solenoid valve 27, a discharge pressure sensor 28, an operation pressure sensor 29, a controller 30, a switch 31, a motor regulator 50, and the like.

The engine 11 is the driving source of the excavator. In the present embodiment, the engine 11 is, for example, a diesel engine as an internal combustion engine that operates to maintain a predetermined rotation speed. The output shaft of the engine 11 is coupled to the respective input shafts of the main pump 14 and the control pump 15.

The main pump 14 is configured to supply hydraulic oil to the control valve 17 via the hydraulic oil line. In the present embodiment, the main pump 14 is, for example, a swash plate variable displacement type hydraulic pump.

The pump regulator 13 is configured to control the discharge amount of the main pump 14. In the present embodiment, the pump regulator 13 controls the discharge amount of the main pump 14 by adjusting the swash plate tilt angle of the main pump 14, for example, according to the discharge pressure of the main pump 14 or the command current from the controller 30, etc.

The control pump 15 is configured to supply hydraulic oil to various hydraulic pressure control devices including the operation device 26. In the present embodiment, the control pump 15 is, for example, a fixed capacity type hydraulic pump.

The control valve 17 is a hydraulic control device that controls a hydraulic system in the excavator. Specifically, the control valve 17 includes a plurality of control valves that control the flow of hydraulic oil discharged by the main pump 14. The control valve 17 selectively supplies the hydraulic oil discharged by the main pump 14 to one or more hydraulic actuators through the control valves. The control valves control the flow volume of hydraulic oil flowing from the main pump 14 to the hydraulic actuator and the flow volume of hydraulic oil flowing from the hydraulic actuator to a hydraulic oil tank. The hydraulic actuator includes the boom cylinder 7, the arm cylinder 8, the bucket cylinder 9, a travelling hydraulic motor 20, and a turning hydraulic motor 2A. The travelling hydraulic motor 20 includes a left travelling hydraulic motor 20L and a right travelling hydraulic motor 20R.

The operation device 26 is a device used by an operator to operate the hydraulic actuators. In the present embodiment, the operation device 26 is a hydraulic type, and via a pilot line, the operation device 26 supplies hydraulic oil discharged by the control pump 15 to the pilot ports of the control valves each corresponding to one of the hydraulic actuators. The pressure of the hydraulic oil supplied to each of the pilot ports (hereinafter referred to as "the pilot pressure") is the pressure in accordance with the operation direction and the operation amount of the levers or pedals constituting the operation device 26 respectively corresponding to the hydraulic actuators. However, the operation device 26 may be electrically powered.

The solenoid valve 27 is disposed in a pipeline CO between the control pump 15 and the motor regulator 50. In the present embodiment, the solenoid valve 27 is a solenoid switching valve for switching between the communication and the blocking of the pipeline CO and operates in response to a command from the controller 30.

The discharge pressure sensor 28 is a sensor for detecting the discharge pressure of the main pump 14, and outputs the detected value to the controller 30.

The operation pressure sensor 29 is configured to detect the operator's operation content using the operation device 26. In the present embodiment, the operation pressure sensor 29 is, for example, a pressure sensor that detects, in the form of pressure, the operation direction and operation amount of each of the levers or pedals that constitute the operation device 26 corresponding to one of the hydraulic actuators, and outputs the detected value to the controller 30. The operation content of the operation device 26 may be detected using the output of devices other than the pressure sensor, such as an operation angle sensor, an acceleration sensor, an angular velocity sensor, a resolver, a voltmeter or an ammeter, and the like. That is, the operation amount of the operation device 26 may be expressed not only by the operation pressure, but also by the operation angle, a double integration value of the operation acceleration, the integration value of the operation angular velocity, the voltage value, the current value, and the like.

The controller 30 is a control device for controlling the excavator. In the present embodiment, the controller 30 is configured of a computer including, for example, a CPU, volatile storage device, a non-volatile storage device, and the like. The controller 30 causes the CPU to execute programs corresponding to various functional elements, for example, a travelling mode control unit 300.

The switch 31 is a switch for switching the operation mode (travelling mode) of the motor regulator 50. In the present embodiment, the switch 31 is a software switch displayed on an in-vehicle display including a touch panel. The switch 31 may be a hardware switch disposed within the cabin 10.

The motor regulator 50 controls the motor capacity of the travelling hydraulic motor 20. In the present embodiment, the motor regulator 50 includes a left motor regulator 50L and a right motor regulator 50R. The left motor regulator 50L controls the motor capacity of the left travelling hydraulic motor 20L by adjusting the swash plate tilt angle of the left travelling hydraulic motor 20L according to the control pressure provided by the hydraulic oil supplied through the solenoid valve 27. The same applies to the right motor regulator 50R.

Specifically, the left motor regulator SOL switches the swash plate tilt angle of the left travelling hydraulic motor 20L between two stages, so that the motor capacity of the left travelling hydraulic motor 20L can be switched between two stages of a high rotation setting and a low rotation setting. The low rotation setting is implemented by increasing the motor capacity. In this case, the left travelling hydraulic motor 20L operates at low rotation with high torque. The high rotation setting is implemented by decreasing the motor capacity. In this case, the left travelling hydraulic motor 20L operates at high rotation with low torque. The same applies to the right motor regulator 50R.

The controller 30 executes a process by the travelling mode control unit 300 based on the output of, for example, the discharge pressure sensor 28, the operation pressure sensor 29, the switch 31, and the like. The controller 30 outputs a command according to the processing result of the travelling mode control unit 300, to the solenoid valve 27 and the like.

The travelling mode control unit 300 controls the travelling mode of the motor regulator 50. In the present embodiment, the travelling mode includes a forced fixed mode and a variable mode. In the forced fixed mode, the motor capacity of the travelling hydraulic motor 20 is forcibly fixed at a low rotation setting. In the variable mode, the motor capacity can be switched between a low rotation setting and a high rotation setting. For example, in the variable mode, when the travelling load exceeds a predetermined threshold value, the motor capacity is switched from the high rotation setting to the low rotation setting, and when the travelling load becomes less than or equal to the predetermined threshold value, the motor capacity is switched from the low rotation setting to the high rotation setting. The travelling mode may include a manual fixed mode. The manual fixed mode is, for example, a travelling mode that is set using the switch 31. In the manual fixed mode, the motor capacity is fixed at the low rotation setting, similar to the case of the forced fixed mode.

The travelling mode control unit 300 outputs a command to the solenoid valve 27 to cause the control pump 15 and the motor regulator 50 to communicate with each other, for example, when a predetermined condition is satisfied. When the control pump 15 is in communication with the motor regulator 50, the motor regulator 50 operates in the forced fixed mode. In this case, the left motor regulator 50L fixes the motor capacity of the left travelling hydraulic motor 20L at the low rotation setting, and the right motor regulator 50R fixes the motor capacity of the right travelling hydraulic motor 20R at the low rotation setting.

Figure 3:
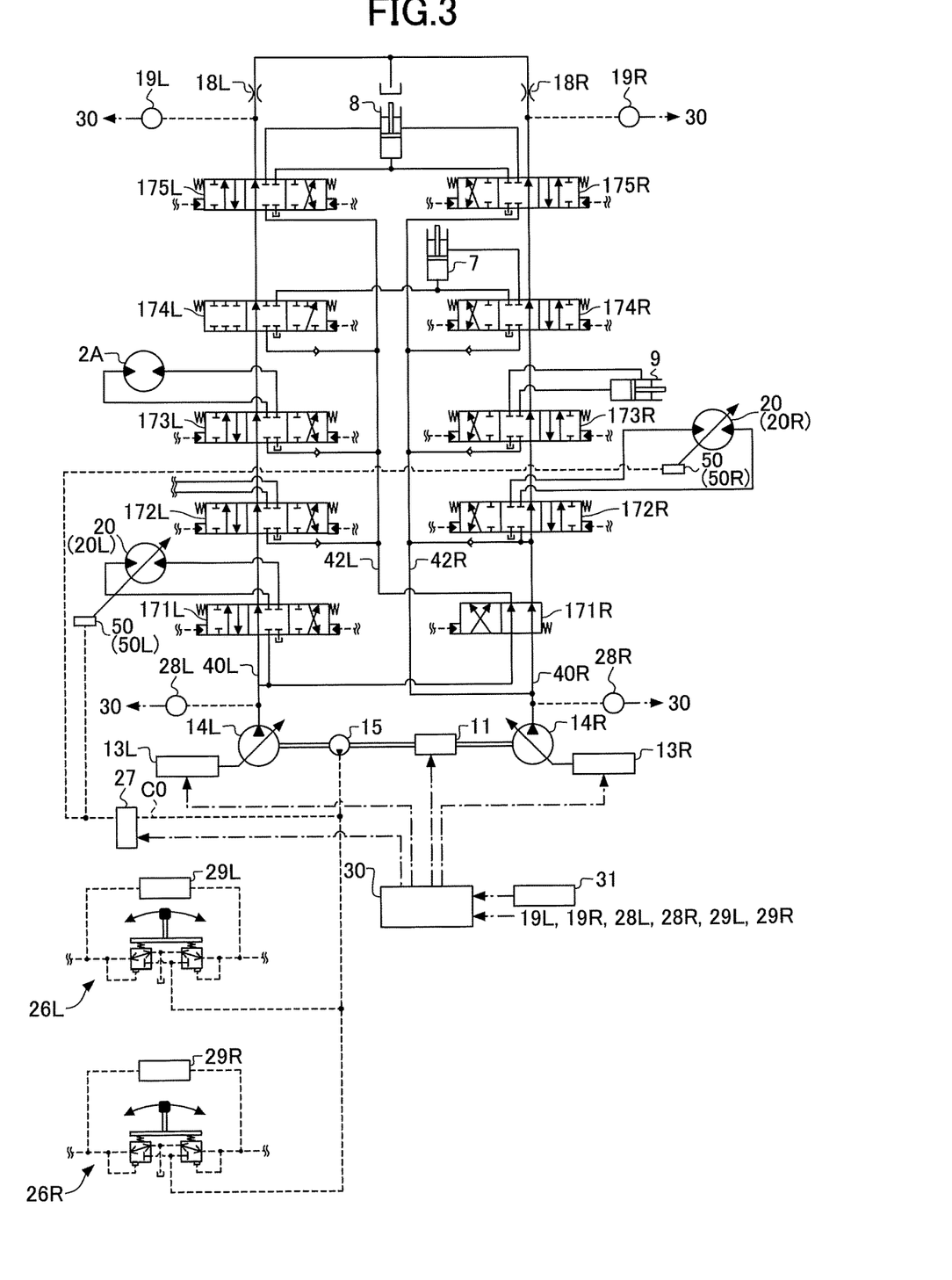
FIG. 3 is a schematic diagram illustrating an example of a configuration of a hydraulic system installed in the excavator of FIG. 1.

Next, referring to FIG. 3, the hydraulic system installed in the excavator will be described. FIG. 3 is a schematic diagram illustrating an example of a configuration of the hydraulic system installed in the excavator of FIG. 1. The hydraulic system of FIG. 3 circulates the hydraulic oil from main pumps 14L and 14R driven by the engine 11 to the hydraulic oil tank via center bypass pipelines 40L and 40R, and parallel pipelines 42L and 42R. The main pumps 14L and 14R correspond to the main pump 14 of FIG. 2.

The center bypass pipeline 40L is a hydraulic oil line passing through control valves 171L to 175L disposed within the control valve 17. The center bypass pipeline 40R is a hydraulic oil line passing through control valves 171R to 175R disposed within the control valve 17.

The control valve 171L is a spool valve that supplies hydraulic oil discharged by the main pump 14L to the left travelling hydraulic motor 20L and that switches the flow of hydraulic oil in order to discharge the hydraulic oil discharged by the left travelling hydraulic motor 20L to the hydraulic oil tank.

The control valve 171R is a spool valve serving as a straight forward travelling valve. The control valve 171R switches the flow of hydraulic oil so that the hydraulic oil is supplied to each of the left travelling hydraulic motor 20L and the right travelling hydraulic motor 20R from the main pump 14L, in order to increase the properties of travelling straight forward by the lower travelling body 1. Specifically, when the travelling hydraulic motor 20 and any other hydraulic actuator are operated simultaneously, the control valve 171R is switched so that the main pump 14L can supply hydraulic oil to both the left travelling hydraulic motor 20L and the right travelling hydraulic motor 20R. When none of the other hydraulic actuators are operated, the control valve 171R is switched so that the main pump 14L can supply hydraulic oil to the left travelling hydraulic motor 20L and the main pump 14R can supply hydraulic oil to the right travelling hydraulic motor 20R.

The control valve 172L is a spool valve that supplies hydraulic oil discharged by the main pump 14L to an optional hydraulic actuator and that switches the flow of hydraulic oil to discharge the hydraulic oil discharged by the optional hydraulic actuator to the hydraulic oil tank. An optional hydraulic actuator is, for example, a grapple open/close cylinder.

The control valve 172R is a spool valve that supplies hydraulic oil discharged by the main pump 14R to the right travelling hydraulic motor 20R and that switches the flow of hydraulic oil in order to discharge the hydraulic oil discharged by the right travelling hydraulic motor 20R to the hydraulic oil tank.

The control valve 173L is a spool valve that supplies hydraulic oil discharged by the main pump 14L to the turning hydraulic motor 2A and that switches the flow of hydraulic oil in order to discharge the hydraulic oil discharged by the turning hydraulic motor 2A to the hydraulic oil tank.

The control valve 173R is a spool valve that supplies the hydraulic oil discharged by the main pump 14R to the bucket cylinder 9 and that discharges the hydraulic oil in the bucket cylinder 9 to the hydraulic oil tank.

The control valves 174L and 174R are spool valves that supply hydraulic oil discharged by the main pumps 14L and 14R to the boom cylinder 7 and that switch the flow of the hydraulic oil in order to discharge the hydraulic oil in the boom cylinder 7 to the hydraulic oil tank. In the present embodiment, the control valve 174L operates only when a lifting operation of the boom 4 is performed, and does not operate when a lowering operation of the boom 4 is performed.

The control valves 175L and 175R are spool valves that supply hydraulic oil discharged by the main pumps 14L and 14R to the arm cylinder 8 and that switch the flow of hydraulic oil in order to discharge the hydraulic oil in the arm cylinder 8 to the hydraulic oil tank.

The parallel pipeline 42L is a hydraulic oil line parallel to the center bypass pipeline 40L. The parallel pipeline 42L can supply hydraulic oil to a control valve at the downstream when the flow of hydraulic oil passing through the center bypass pipeline 40L is limited or blocked by any one of the control valves 171L to 174L. The parallel pipeline 42R is a hydraulic oil line parallel to the center bypass pipeline 40R. The parallel pipeline 42R can supply hydraulic oil to a control valve at the downstream when the flow of hydraulic oil passing through the center bypass pipeline 40R is limited or blocked by any one of the control valves 172R to 174R.

Pump regulators 13L and 13R control the discharge amounts of the main pumps 14L and 14R by adjusting the swash plate tilt angles of the main pumps 14L and 14R according to the discharge pressure of the main pumps 14L and 14R. The pump regulators 13L and 13R correspond to the pump regulator 13 of FIG. 2. The pump regulators 13L and 13R adjust the swash plate tilt angle of the main pumps 14L and 14R to decrease the discharge amount, for example, when the discharge pressure of the main pumps 14L and 14R increases. This is done in order to prevent the absorbed horsepower of the main pump 14, which is expressed as the product of the discharge pressure and the discharge amount, from exceeding the output horsepower of the engine 11.

A left travelling operation device 26L and a right travelling operation device 26R serving as travel operation devices are examples of the operation device 26. In the present embodiment, these devices are configured by a combination of a travelling operation lever and a travelling operation pedal.

The left travelling operation device 26L is used to operate the left travelling hydraulic motor 20L. The left travelling operation device 26L uses the hydraulic oil discharged by the control pump 15 to apply pilot pressure according to the operating amount to the pilot port of the control valve 171L. Specifically, the left travelling operation device 26L applies pilot pressure to the left pilot port of the control valve 171L when operated in the forward travelling direction and applies pilot pressure to the right pilot port of the control valve 171L when operated in the backward travelling direction.

The right travelling operation device 26R is used to operate the right travelling hydraulic motor 20R. The right travelling operation device 26R uses the hydraulic oil discharged by the control pump 15 to apply pilot pressure according to the operating amount to the pilot port of the control valve 172R. Specifically, the right travelling operation device 26R applies pilot pressure to the right pilot port of the control valve 172R when operated in the forward travelling direction and applies pilot pressure to the left pilot port of the control valve 172R when operated in the backward travelling direction.

The solenoid valve 27 communicates the control pump 15 with the motor regulator 50 while receiving a communication command from the controller 30. In this case, the motor regulator 50 operates in a forced fixed mode. On the other hand, the solenoid valve 27 blocks the communication between the control pump 15 and the motor regulator 50 when a communication command is not received from the controller 30. In this case, the motor regulator 50 operates in the variable mode.

Discharge pressure sensors 28L and 28R are an example of the discharge pressure sensor 28 of FIG. 2. The discharge pressure sensor 28L detects the discharge pressure of the main pump 14L and outputs the detected value to the controller 30. The discharge pressure sensor 28R detects the discharge pressure of the main pump 14R and outputs the detected value to the controller 30.

Operation pressure sensors 29L and 29R are an example of the operation pressure sensor 29 of FIG. 2. The operation pressure sensor 29L detects the operator's operation contents with respect to the left travelling operation device 26L in the form of pressure and outputs the detected value to the controller 30. The operation pressure sensor 29R detects the operator's operation contents with respect to the right travelling operation device 26R in the form of pressure and outputs the detected value to the controller 30. The operation contents are, for example, an operation direction, an operation amount (operation angle), and the like.

A boom operation lever, an arm operation lever, a bucket operation lever, and a turning operation lever (none of which are illustrated in the drawings) are operation devices for operating the vertical movement of the boom 4, the opening and closing of the arm 5, the opening and closing of the bucket 6, and the turning of the upper turning body 3, respectively. Similar to the left travelling operation device 26L, these operation devices use the hydraulic oil discharged by the control pump 15 to apply a pilot pressure according to the lever operation amount to either the left pilot port or the right pilot port of the corresponding control valve. Further, the operator's operation contents for each of these operation devices are detected in the form of pressure by a corresponding operation pressure sensor, similar to the operation pressure sensor 29L, and the detected value is output to the controller 30.

Here, negative control adopted in the hydraulic system of FIG. 3 will be described.

The center bypass pipelines 40L and 40R respectively include throttles 18L and 18R between the control valves 175L and 175R at the most downstream and the hydraulic oil tank. The flow of hydraulic oil discharged by the main pumps 14L and 14R is limited by the throttles 18L and 18R. The throttles 18L and 18R generate control pressure for controlling the pump regulators 13L and 13R.

Control pressure sensors 19L and 19R are sensors that detect the control pressure generated at the upstream of the throttles 18L and 18R. In the present embodiment, the control pressure sensors 19L and 19R output the detected values to the controller 30.

The controller 30 outputs a command corresponding to the control pressure to the pump regulators 13L and 13R. The pump regulators 13L and 13R control the discharge amount of the main pumps 14L and 14R by adjusting the swash plate tilt angle of the main pumps 14L and 14R in response to a command. Specifically, the pump regulators 13L and 13R decrease the discharge amounts of the main pumps 14L and 14R as the control pressure becomes higher, and increase the discharge amount of the main pumps 14L and 14R as the control pressure becomes lower.

When none of the hydraulic actuators are operated, the hydraulic oil discharged by the main pumps 14L and 14R passes through the center bypass pipelines 40L and 40R and reaches the throttles 18L and 18R. The flow of hydraulic oil discharged by the main pumps 14L and 14R increases the control pressure generated at the upstream of the throttles 18L and 18R. As a result, the pump regulators 13L and 13R decrease the discharge amount of the main pumps 14L and 14R to the allowable minimum discharge amount, and prevent the pressure loss (pumping loss) when the discharged hydraulic oil passes through the center bypass pipelines 40L and 40R.

On the other hand, when any of the hydraulic actuators is operated, the hydraulic oil discharged by the main pumps 14L and 14R flows to the hydraulic actuator that is the operation target, via a control valve corresponding to the hydraulic actuator that is the operation target. The flow of the hydraulic oil discharged by the main pumps 14L and 14R is decreased or eliminated in amount reaching the throttles 18L and 18R, thereby lowering the control pressure generated at the upstream of the throttles 18L and 18R. As a result, the pump regulators 13L and 13R increase the discharge amount by the main pumps 14L and 14R, circulating sufficient hydraulic oil to the hydraulic actuator that is the operation target, and ensuring the driving of the hydraulic actuator that is the operation target.

With the configuration described above, the hydraulic system of FIG. 3 can decrease wasteful energy consumption of the main pumps 14L and 14R when none of the hydraulic actuators are operated. Wasteful energy consumption includes pumping loss that arises in the center bypass pipelines 40L and 40R by the hydraulic oil discharged by the main pumps 14L and the 14R. When the hydraulic actuator is operated, it is possible to ensure that sufficient and necessary hydraulic oil is supplied from the main pumps 14L and 14R to the hydraulic actuator that is the operation target.

Figure 4:
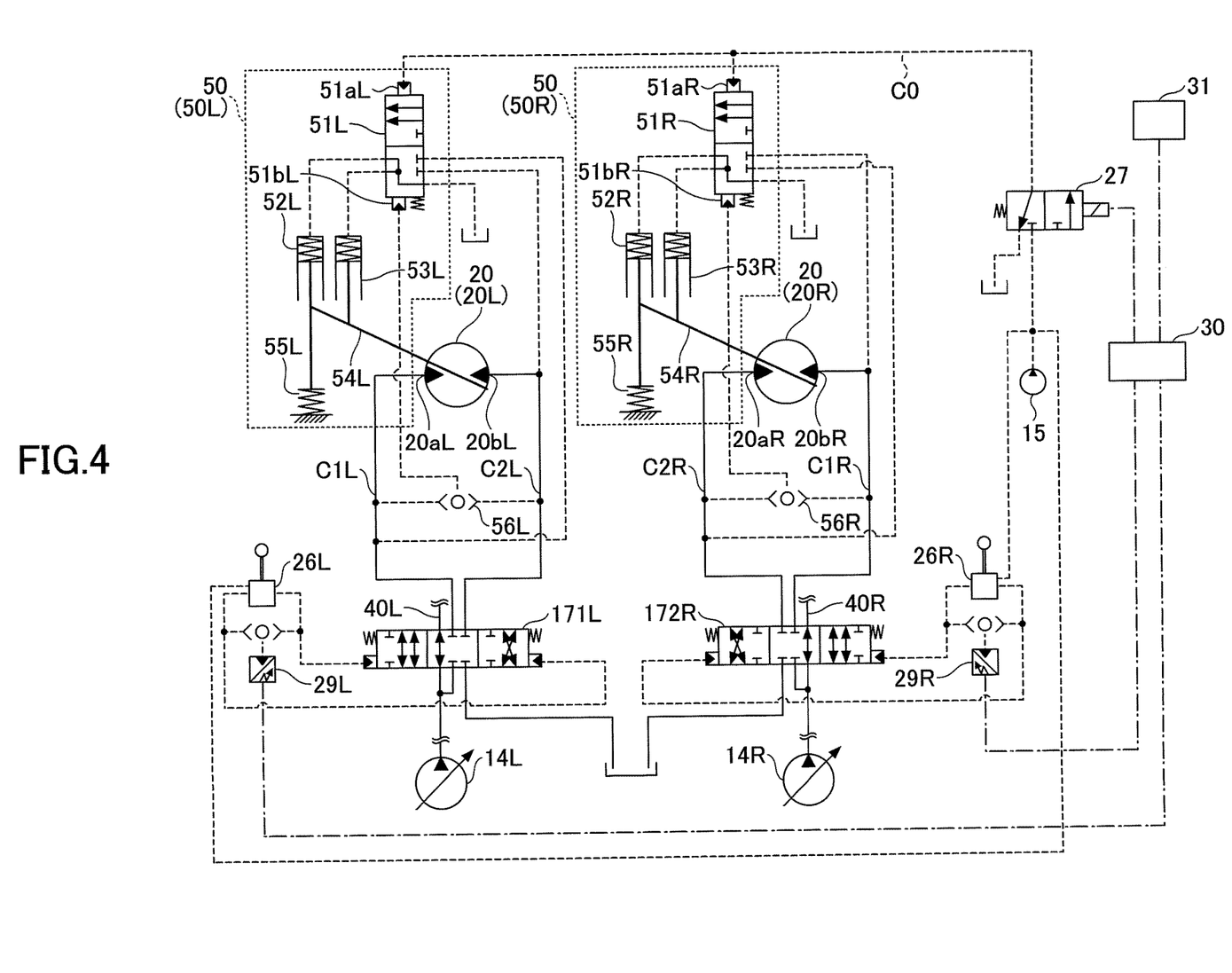
FIG. 4 is a diagram illustrating a configuration example of a hydraulic circuit associated with a motor regulator.

Next, the motor regulator 50 will be described with reference to FIG. 4. FIG. 4 is a diagram illustrating an example of a configuration of a hydraulic circuit associated with the motor regulator 50. The motor regulator 50 includes the left motor regulator 50L and the right motor regulator 50R. Hereinafter, the left motor regulator 50L will be described. However, this description also applies to the right motor regulator 50R.

The left motor regulator 50L mainly includes a setting switch valve 51L, a first cylinder 52L, a second cylinder 53L, a swash plate link mechanism 54L, a spring 55L, and the like.

The setting switch valve 51L is a valve for switching the motor capacity of the left travelling hydraulic motor 20L in two stages, i.e., the high rotation setting and the low rotation setting. A first port 51aL of the setting switch valve 51L is connected to the secondary side of the solenoid valve 27, and a second port 51bL of the setting switch valve 51L is connected to a shuttle valve 56L.

The shuttle valve 56L is configured to connect a pipeline C1L or a pipeline C2L, whichever having the higher pressure, with the second port 51bL of the setting switch valve 51L. The pipeline C1L connects a first port 20aL of the left travelling hydraulic motor 20L to the control valve 171L. The pipeline C2L connects a second port 20bL of the left travelling hydraulic motor 20L to the control valve 171L.

The setting switch valve 51L has a first valve position and a second valve position. The first valve position corresponds to the low rotation setting, and the second valve position corresponds to the high rotation setting. FIG. 4 illustrates the state when the setting switch valve 51L is in the first valve position.

At the first valve position, the setting switch valve 51L communicates each of the first cylinder 52L and the second cylinder 53L with the hydraulic oil tank. At the second valve position, the setting switch valve 51L communicates the first cylinder 52L with the pipeline C1L, and communicates the second cylinder 53L with the pipeline C2L.

The first cylinder 52L and the second cylinder 53L are hydraulic actuators that operate the swash plate link mechanism 54L. When the first cylinder 52L and the second cylinder 53L are connected to the hydraulic oil tank via the setting switch valve 51L, the hydraulic oil in the cylinders is discharged to the hydraulic oil tank and the cylinders retract, thereby moving the swash plate link mechanism 54L in a direction in which the swash plate tilt angle is increased. As a result, in the present embodiment, the motor capacity of the left travelling hydraulic motor 20L becomes maximum. On the other hand, when the first cylinder 52L and the second cylinder 53L are connected to the pipelines C1L and C2L via the setting switch valve 51L, the cylinders receive the hydraulic oil and the cylinders extend, thereby moving the swash plate link mechanism 54L in a direction in which the swash plate tilt angle is decreased. As a result, in the present embodiment, the motor capacity of the left travelling hydraulic motor 20L becomes minimum.

The spring 55L preloads the swash plate link mechanism 54L in a direction in which the swash plate tilt angle increases. When the first cylinder 52L and the second cylinder 53L in the extended state are connected to the hydraulic oil tank via the setting switch valve 51L, the first cylinder 52L and the second cylinder 53L retract while discharging the hydraulic oil in the cylinders, according to the restoring force of the spring 55L. As a result, the swash plate link mechanism 54L moves in the direction in which the swash plate tilt angle increases, and the motor capacity of the left travelling hydraulic motor 20L becomes maximum.

Figure 5:
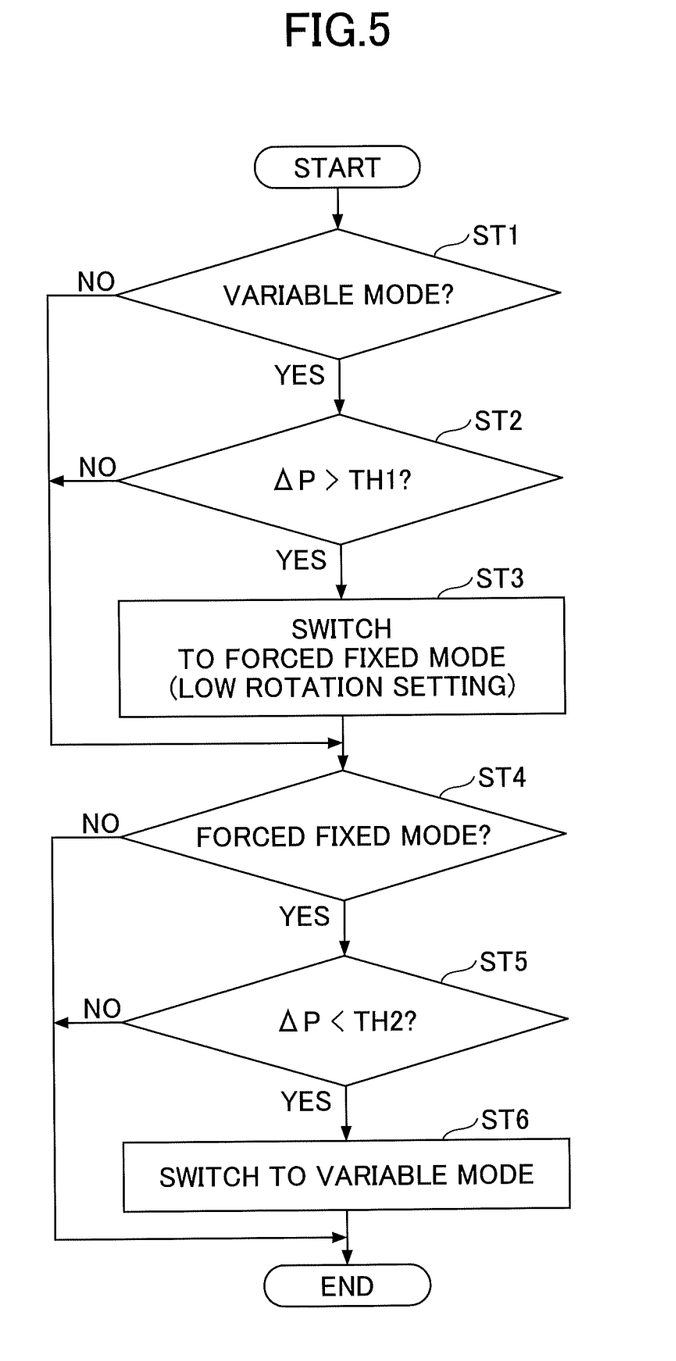
FIG. 5 is a flowchart illustrating an example of a travelling mode switching process.

Here, referring to FIGS. 4 and 5, a process in which the controller 30 switches the travelling mode of the motor regulator 50 (hereinafter referred to as "travelling mode switching process") will be described. FIG. 5 is a flowchart illustrating an example of a travelling mode switching process, in which the controller 30 repeatedly executes the travelling mode switching process in predetermined control cycles when at least one of the left travelling operation device 26L and the right travelling operation device 26R is operated.

First, the travelling mode control unit 300 of the controller 30 determines whether the travelling mode of the motor regulator 50 is the variable mode (step ST1). In the present embodiment, the travelling mode is set to the variable mode or the manual fixed mode by using the switch 31. Whether the travelling mode is the variable mode is managed by using, for example, a flag.

When it is determined that the travelling mode is the variable mode (YES in step ST1), the travelling mode control unit 300 determines the load state of the travelling hydraulic motor 20. For example, when the excavator is travelling on a flat ground with almost no tilt, the travelling mode control unit 300 determines that the travelling hydraulic motor 20 is in a low load state. In this case, the controller 30 sets the motor capacity to a high rotation setting.

When it is determined that the travelling mode is the variable mode (YES in step ST1), the travelling mode control unit 300 determines whether a differential pressure $\Delta P$ (=|PL−PR|) between an operation pressure PL detected by the operation pressure sensor 29L and an operation pressure PR detected by the operation pressure sensor 29R exceeds a first threshold value TH1 (step ST2). The differential pressure $\Delta P$ exceeds the first threshold value TH1 when, for example, the operation amount in the forward travelling direction of the left travelling operation device 26L is larger by a predetermined amount than the operation amount in the forward travelling direction of the right travelling operation device 26R, that is, when an operation is performed to cause the lower travelling body 1 to turn in the right direction (hereinafter, referred to as "right turning operation"). Alternatively, the differential pressure $\Delta P$ exceeds the first threshold value TH1 when, for example, the operation amount in the forward travelling direction of the right travelling operation device 26R is larger by a predetermined amount than the operation amount in the forward travelling direction of the left travelling operation device 26L, that is, when an operation is performed to cause the lower travelling body 1 to turn in the left direction (hereinafter, referred to as "left turning operation") is performed. Alternatively, the differential pressure $\Delta P$ exceeds the first threshold value TH1 when, for example, a pivot turn (pivotal turn) or a spin turn (ultra-pivotal turn) is performed.

As described above, the travelling mode control unit 300 determines whether a predetermined operation, such as a right turning operation, a left turning operation, a pivot turn operation, a spin turn operation, and the like, is performed based on the differential pressure $\Delta P$. However, the travelling mode control unit 300 may determine whether a predetermined operation is being performed based on an angle difference between a lever operation angle of the left travelling operation device 26L and a lever operation angle of the right travelling operation device 26R. Further, it may also be determined whether a predetermined operation is being performed based on any other detected value.

When it is determined that the differential pressure $\Delta P$ exceeds the first threshold value TH1 (YES in step ST2), the travelling mode control unit 300 switches the travelling mode of the motor regulator 50 to the forced fixed mode (step ST3). That is, the controller 30 fixes the motor capacity of the travelling hydraulic motor 20 to the low rotation setting. Specifically, the controller 30 switches the motor capacity to the low rotation setting when the current motor capacity is in the high rotation setting. Further, the controller 30 maintains the motor capacity in the low rotation setting when the current motor capacity is in the low rotation setting.

On the other hand, when it is determined that the travelling mode is not the variable mode (NO in step ST1) or when it is determined that the differential pressure $\Delta P$ is less than or equal to the first threshold value TH1 (NO in step ST2), the travelling mode control unit 300 executes step ST4 without switching the travelling mode to the forced fixed mode. That is, the controller 30 maintains the variable mode when the current travelling mode is the variable mode. In the variable mode, when the current setting is the high rotation setting, the motor capacity of the travelling hydraulic motor 20 is switched to a low rotation setting when the travelling load exceeds a predetermined threshold value. Further, when the current setting is the low rotation setting, the motor capacity is switched to the high rotation setting when the travelling load becomes less than or equal to the predetermined threshold value.

Thereafter, the travelling mode control unit 300 determines whether the travelling mode of the motor regulator 50 is the forced fixed mode (step ST4). Whether the travelling mode is the forced fixed mode is managed, for example, by using a flag.

When it is determined that the travelling mode is the forced fixed mode (YES in step ST4), the travelling mode control unit 300 determines whether the differential pressure $\Delta P$ is below a second threshold value TH2 (step ST5). For example, the differential pressure $\Delta P$ is lower than the second threshold value TH2 when the operation amount in the forward travelling direction of the left travelling operation device 26L and the operation amount in the forward travelling direction of the right travelling operation device 26R are substantially equal, that is, when an operation of causing the lower travelling body 1 to travel straight forward is performed. In the present embodiment, the second threshold value TH2 is a value that is smaller than the first threshold value TH1. This is to prevent the travelling mode from being frequently switched between the variable mode and the forced fixed mode.

When it is determined that the differential pressure ΔP is lower than the second threshold value TH2 (YES in step ST5), the travelling mode control unit 300 switches the travelling mode of the motor regulator 50 to the variable mode (step ST6). In the variable mode, when the current setting is the high rotation setting, the motor capacity of the travelling hydraulic motor 20 is switched to the low rotation setting when the travelling load exceeds a predetermined threshold value. Further, when the current setting is the low rotation setting, the motor capacity is switched to the high rotation setting when the travelling load becomes less than or equal to a predetermined threshold value.

On the other hand, when it is determined that the travelling mode is not the forced fixed mode (NO in step ST4) or when it is determined that the differential pressure ΔP is greater than or equal to the second threshold value TH2 (NO in step ST5), the travelling mode control unit 300 ends the present travelling mode switching process without switching the travelling mode to the variable mode. That is, the controller 30 maintains the forced fixed mode when the current travelling mode is the forced fixed mode. In the forced fixed mode, the controller 30 fixes the motor capacity of the travelling hydraulic motor 20 to the low rotation setting.

For example, when the travelling movement of the lower travelling body 1 is switched from turning to travelling straight forward, typically, the left and right travelling operation levers are largely tilted, and, therefore, the differential pressure ΔP is decreased. Therefore, when the travelling movement of the lower travelling body 1 is changed from turning to travelling straight forward, the motor capacity is typically switched to the high rotation setting. This is because when the excavator is travelling straight forward along a flat ground, the travelling hydraulic motor 20 is in the low load state. However, when the excavator is turning along a flat ground, the motor capacity is maintained at a low rotation setting. This is to prevent the motor capacity from being frequently switched between the high rotation setting and the low rotation setting.

Figure 6A:
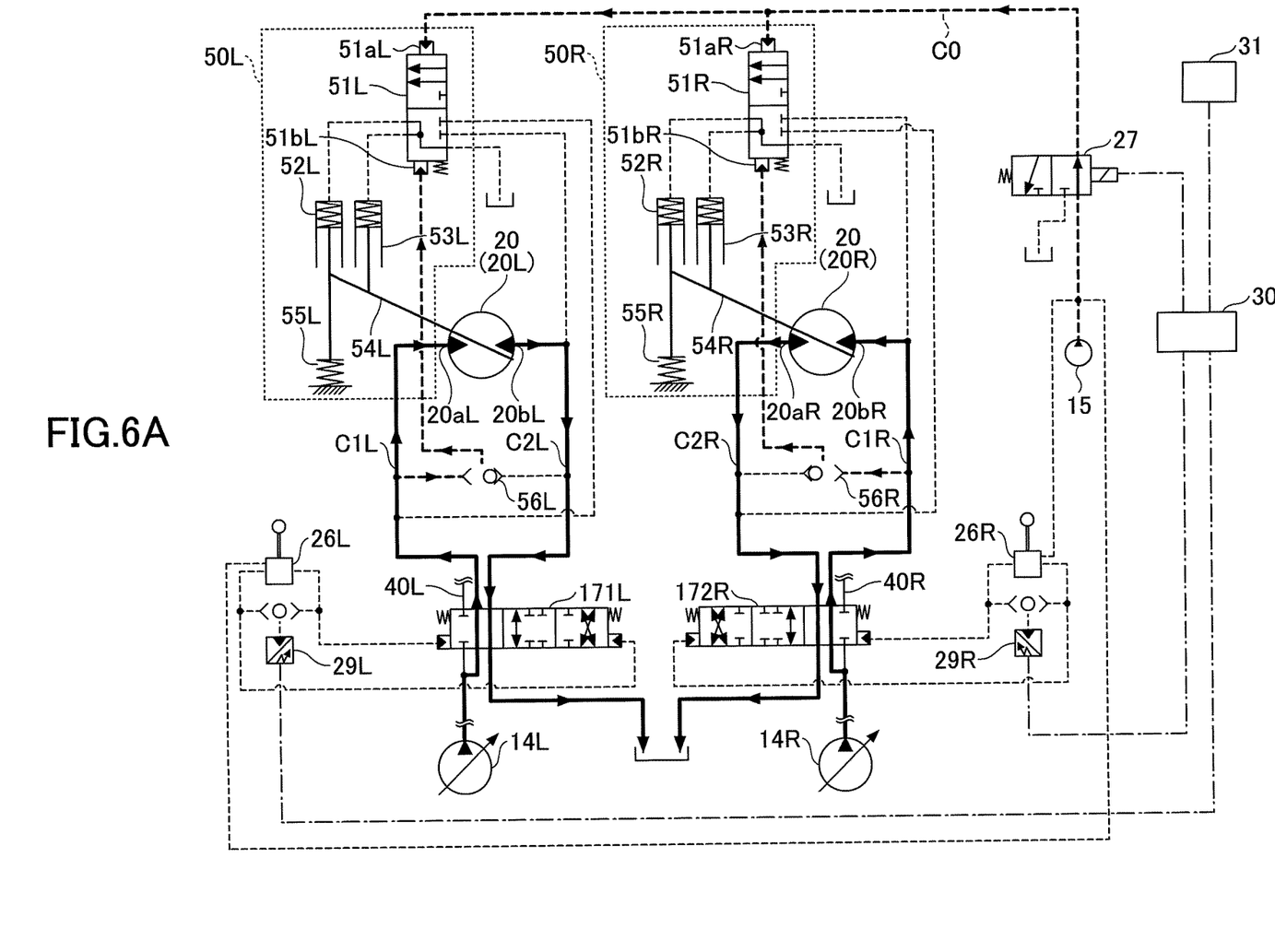
FIG. 6A is a diagram illustrating the state of the hydraulic circuit associated with the motor regulator.
Figure 6B:
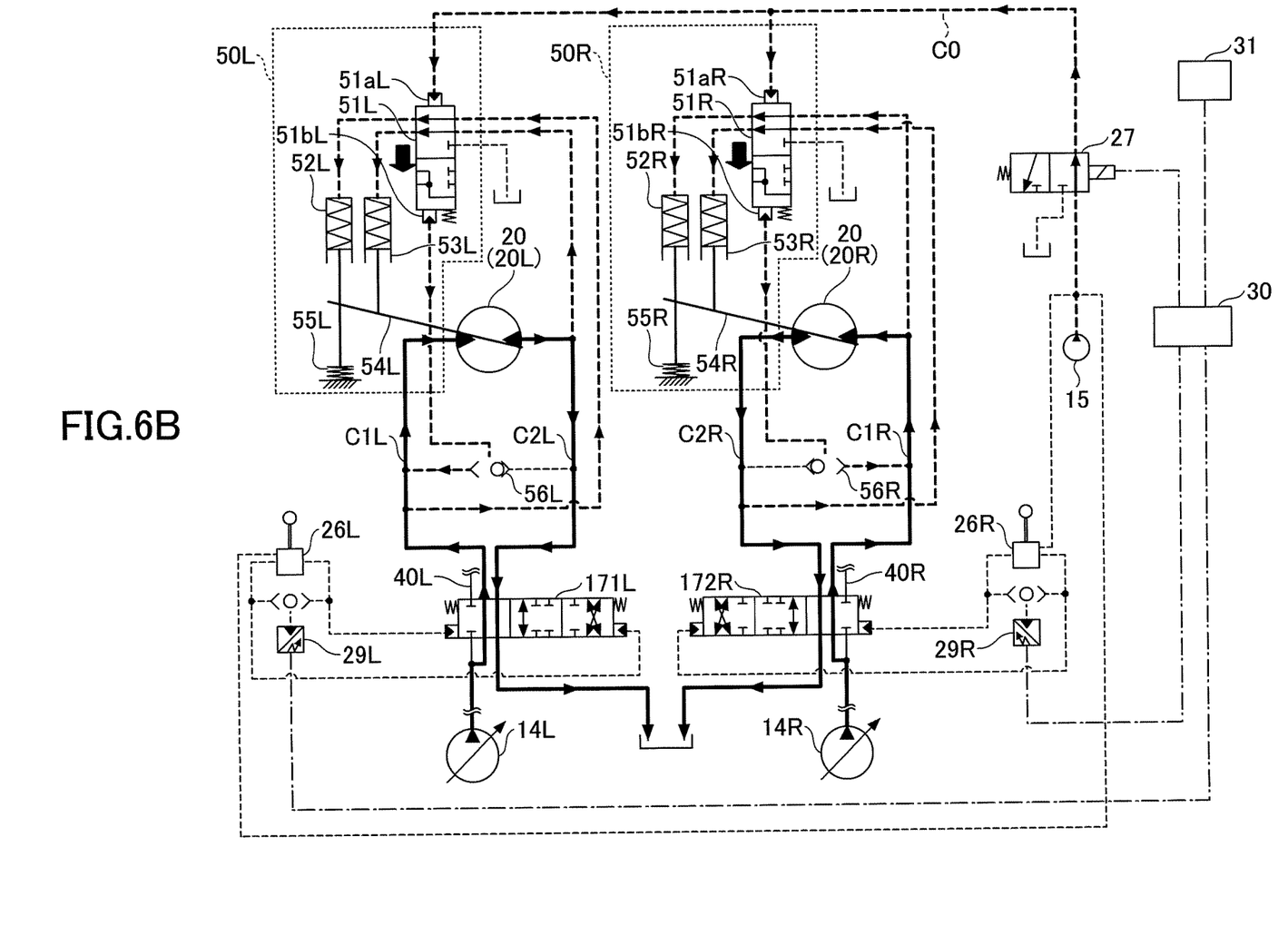
FIG. 6B is a diagram illustrating another state of the hydraulic circuit associated with the motor regulator.
Figure 6C:
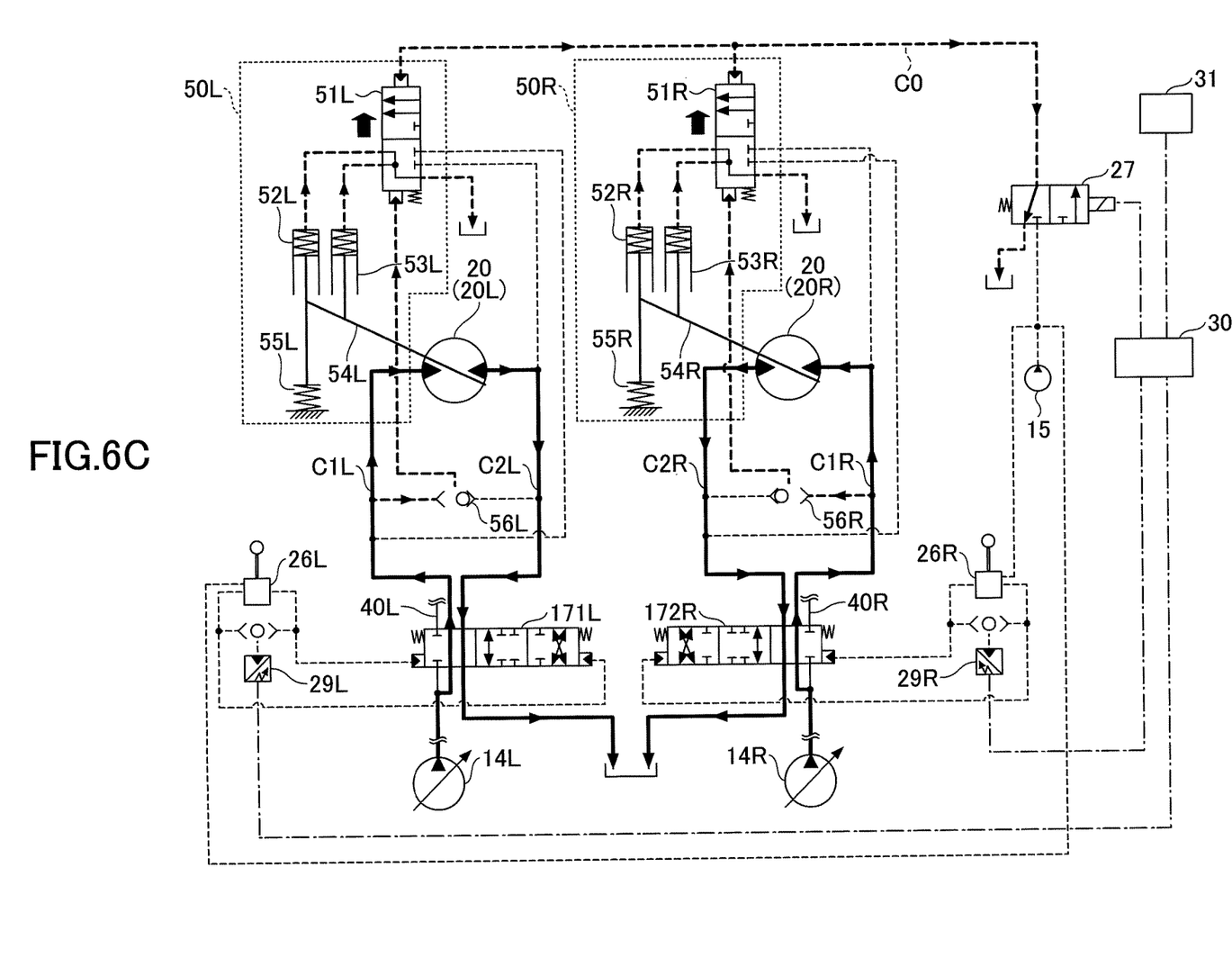
FIG. 6C is a diagram illustrating yet another state of the hydraulic circuit associated with a motor regulator.

Next, the movement of the motor regulator 50 will be described with reference to FIGS. 6A to 6C. FIGS. 6A to 6C are diagrams illustrating the state of the hydraulic circuit associated with the motor regulator 50 when the lower travelling body 1 is travelling straight forward, and FIGS. 6A to 6C correspond to FIG. 4. Specifically, FIGS. 6A and 6B illustrate a state when an operation (hereinafter, referred to as "straightforward travel operation") is performed to cause the lower travelling body 1 to travel straight forward. FIG. 6C illustrates a state when an operation is performed to cause the lower travelling body 1 to turn to the right.

When the straightforward travel operation is performed, as illustrated in FIG. 6A, the control valve 171L moves to the right and the control valve 172R moves to the left. Then, the hydraulic oil discharged by the main pump 14L passes through the control valve 171L and the pipeline C1L and reaches the first port 20aL of the left travelling hydraulic motor 20L. The hydraulic oil discharged from the second port 20bL of the left travelling hydraulic motor 20L passes through the pipeline C2L and the control valve 171L and reaches the hydraulic oil tank. The same applies to the right travelling hydraulic motor 20R.

The controller 30 controls the travelling mode of the motor regulator 50 based on the output of the switch 31. In FIG. 6A, the variable mode is selected with the switch 31, and, therefore, the controller 30 outputs a communication command to the solenoid valve 27. The solenoid valve 27 that has received the communication command communicates the control pump 15 with the motor regulator 50. As a result, the pressure caused by the hydraulic oil discharged by the control pump 15 is applied to the first port 51aL of the setting switch valve 51L, thereby providing a force for moving the setting switch valve 51L downward. Similarly, the pressure caused by the hydraulic oil discharged by the control pump 15 is applied to a first port 51aR of a setting switch valve 51R, thereby providing a force for moving the setting switch valve 51R downward.

To the second port 51bL of the setting switch valve 51L, a force by the hydraulic oil flowing through the pipeline C1L (a force for moving the setting switch valve 51L upward) is applied, and to a second port 51bR of the setting switch valve 51R, a force by the hydraulic oil flowing through the pipeline C1R (a force for moving the setting switch valve 51R upward) is applied.

In FIG. 6A, the force for moving the setting switch valve 51L upward is greater than the force for moving the setting switch valve 51L downward. Therefore, the setting switch valve 51L moves upward to connect each of the first cylinder 52L and the second cylinder 53L to the hydraulic oil tank. The first cylinder 52L and the second cylinder 53L are each retracted, and the swash plate link mechanism 54L moves in a direction in which the swash plate tilt angle increases. As a result, the motor capacity of the left travelling hydraulic motor 20L becomes maximum (low rotation setting). Similarly, the motor capacity of the right travelling hydraulic motor 20R also becomes maximum (low rotation setting).

When the travelling load decreases while the straightforward travel operation is being performed, the pressure of the hydraulic oil flowing through the pipeline C1L, decreases and the force to move the setting switch valve 51L upward decreases. Then, when the force to move the setting switch valve 51L upward is less than the force to move the setting switch valve 51L downward, the setting switch valve 51L moves downward as indicated by a block arrow in FIG. 6B. At this time, the pressure of the hydraulic oil flowing through the pipeline C1L, that is, the discharge pressure of the main pump 14L, is less than the threshold value THa. The setting switch valve 51L connects the first cylinder 52L with the pipeline C1L and connects the second cylinder 53L with the pipeline C2L. The first cylinder 52L and the second cylinder 53L are extended by receiving hydraulic oil from the pipeline C1L and the pipeline C2L, and the swash plate link mechanism 54L moves in a direction in which the swash plate tilt angle decreases. As a result, the motor capacity of the left travelling hydraulic motor 20L becomes minimum (high rotation setting). Similarly, the motor capacity of the right travelling hydraulic motor 20R also becomes minimum (high rotation setting).

Note that when the travelling load increases thereafter, the pressure of the hydraulic oil flowing through the pipeline C1L increases, and the force to move the setting switch valve 51L upward increases. Then, when the force to move the setting switch valve 51L upward becomes greater than the force to move the setting switch valve 51L downward, the setting switch valve 51L moves upward again. At this time, the discharge pressure of the main pump 14L is greater than or equal to the threshold value THa. When the setting switch valve 51L moves upward, the first cylinder 52L and the second cylinder 53L are connected to the hydraulic oil tank again. Therefore, the first cylinder 52L and the second cylinder 53L are respectively retracted, and the swash plate link mechanism 54L moves in a direction in which the swash plate tilt angle increases. As a result, the motor capacity of the left travelling hydraulic motor 20L becomes maximum (low rotation setting). Similarly, the motor capacity of the right travelling hydraulic motor 20R also becomes maximum (low rotation setting).

The travelling load (travelling resistance) is typically relatively large at the start of travelling and decreases as the travelling speed increases. Further, the travelling load increases when travelling uphill and the travelling load decreases when travelling downhill. Further, the travelling load varies depending on the road surface conditions.

Thereafter, when the right turning operation is performed, the controller 30 stops outputting the communication command to the solenoid valve 27, as illustrated in FIG. 6C. Specifically, when the controller 30 determines that the differential pressure $\Delta P$ (=|PL−PR|) between the operation pressure PL detected by the operation pressure sensor 29L and the operation pressure PR detected by the operation pressure sensor 29R exceeds the first threshold value TH1, the controller 30 stops outputting the communication command to the solenoid valve 27. In this case, the solenoid valve 27 blocks the communication between the control pump 15 and the setting switch valve 51L. Then, the hydraulic oil in the pipeline CO between the setting switch valve 51L and the control pump 15 is discharged to the hydraulic oil tank. As a result, the force to move the setting switch valve 51L downward is decreased. When the force to move the setting switch valve 51L downward becomes smaller than the force to move the setting switch valve 51L upward, the setting switch valve 51L moves upward as indicated by the block arrow in FIG. 6C, to connect each of the first cylinder 52L and the second cylinder 53L to the hydraulic oil tank. Therefore, the first cylinder 52L and the second cylinder 53L are respectively retracted, and the swash plate link mechanism 54L moves in a direction in which the swash plate tilt angle increases. As a result, the motor capacity of the left travelling hydraulic motor 20L becomes maximum (low rotation setting). Similarly, the motor capacity of the right travelling hydraulic motor 20R also becomes maximum (low rotation setting).

In this manner, the controller 30 can switch the travelling mode of the motor regulator 50 according to the operation contents with respect to each of the left travelling operation device 26L and the right travelling operation device 26R, separately from the setting of the travelling mode performed by the operator by using the switch 31.

Figure 7:
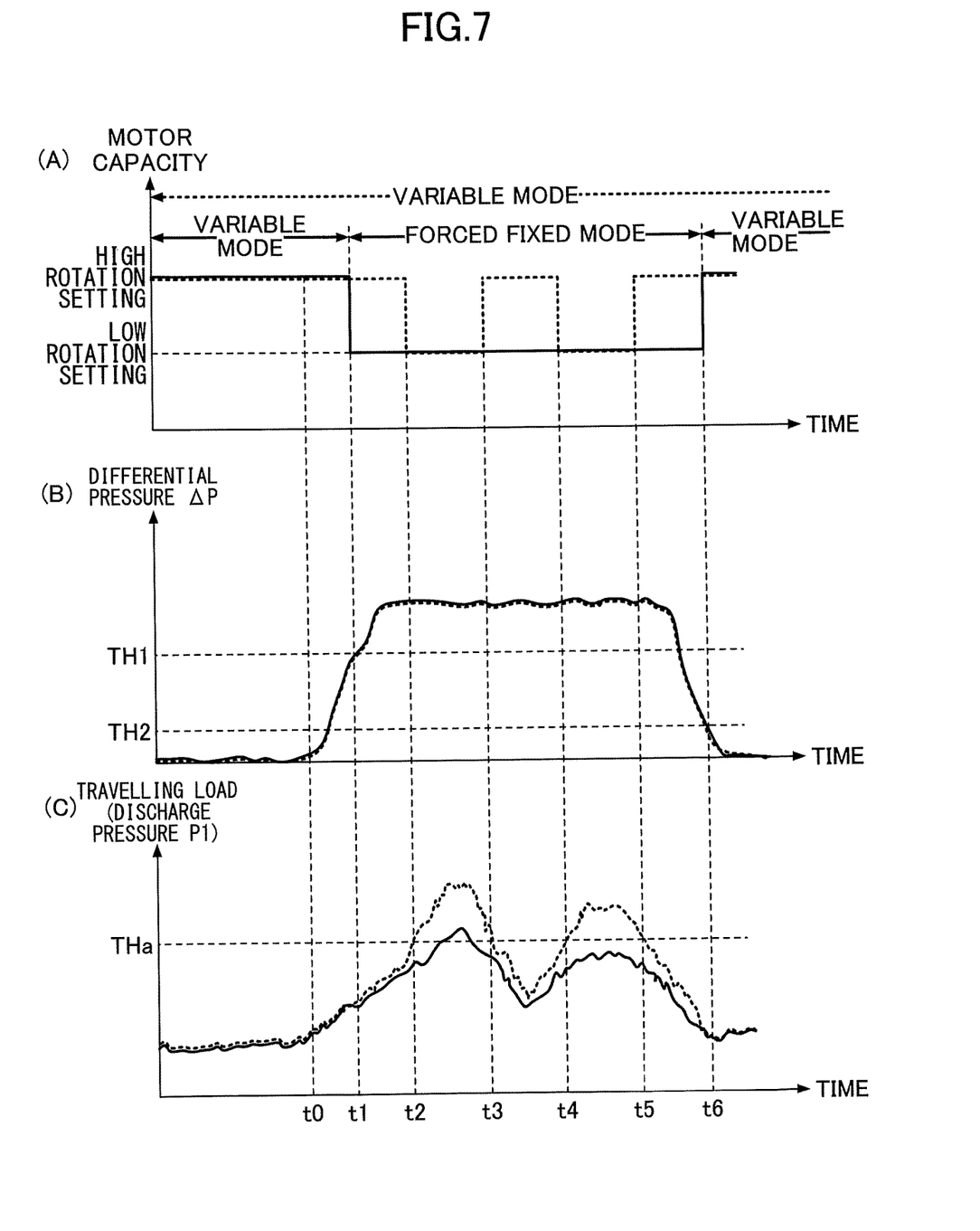
FIG. 7 is a diagram illustrating the time-course transition in the motor capacity, the differential pressure, and the travelling load when a right turning operation is performed.

Next, the effect of the travelling mode switching process will be described with reference to FIG. 7. FIG. 7 is a diagram illustrating the time-course transition of the motor capacity, the differential pressure $\Delta P$, and the travelling load when a right turning operation is performed. The solid line in FIG. 7 represents the transition when the travelling mode switching process is executed, and the dotted line in FIG. 7 represents the transition when the travelling mode switching process is not executed, that is, the transition when the variable mode is continued. The travelling load is a detected value of the discharge pressure sensor 28L that detects a discharge pressure P1 of the main pump 14L that supplies hydraulic oil to the left travelling hydraulic motor 20L.

At time t0, when the operator starts a right turning operation, the differential pressure $\Delta P$ starts to increase. Before the time t0, the operator of the excavator has been performing the straightforward travel operation. In the case where the travelling mode switching process is executed, at time t1, when the differential pressure $\Delta P$ exceeds the first threshold value TH1, the travelling mode control unit 300 switches the travelling mode of the motor regulator 50 to the forced fixed mode. As a result, the motor capacity is switched to the low rotation setting (see solid line in FIG. 7(A)).

When the travelling mode switching process is not executed, the variable mode is continued. Therefore, the motor capacity is maintained at the high rotation setting until the discharge pressure P1 reaches the threshold value THa (see dotted line in FIG. 7(A)). Then, as illustrated by the dotted line in FIG. 7(C), at time t2, when the discharge pressure P1 reaches the threshold value THa, the motor capacity is switched to the low rotation setting (see the dotted line in FIG. 7(A)). Thereafter, the motor capacity is switched every time the discharge pressure P1 traverses the threshold value THa. Specifically, at time t3, when the discharge pressure P1 becomes less than the threshold value THa, the motor capacity is switched from the low rotation setting to the high rotation setting. Further, at time t4, when the discharge pressure P1 becomes greater than or equal to the threshold value THa, the motor capacity is switched from the high rotation setting to the low rotation setting. Further, at time t5, when the discharge pressure P1 becomes greater than or equal to the threshold value THa, the motor capacity is switched from the high rotation setting to the low rotation setting. Thus, when the travelling mode switching process is not executed, the motor capacity is frequently switched between the high rotation setting and the low rotation setting.

On the other hand, when the travelling mode switching process is executed, unless the differential pressure $\Delta P$ becomes less than the second threshold value TH2, the travelling mode of the motor regulator 50 is fixed to the forced fixed mode. Thus, the motor capacity remains fixed at the low rotation setting. At time t6, when the differential pressure $\Delta P$ becomes lower than the second threshold value TH2, the travelling mode of the motor regulator 50 returns to the variable mode. In the example of FIG. 7, the discharge pressure P1 is less than the threshold value THa at a time t6, and, therefore, the motor capacity is switched to the high rotation setting.

As described above, when the travelling mode switching process is executed, the travelling mode of the motor regulator 50 is switched to the forced fixed mode when the right turning operation is performed, and the motor capacity is switched to the low rotation setting. Therefore, the variation in the rotation speed of the travelling hydraulic motor 20 during the right turning operation is reduced. As a result, the travelling hydraulic motor 20 can be operated more stably and the travelling operability of the excavator can be improved.

Further, the travelling mode is returned to the variable mode when the right turning operation is completed, and the motor capacity becomes switchable between the low rotation setting and the high rotation setting. Accordingly, in the straightforward travel operation after the right turning operation, the travelling hydraulic motor 20 can be operated in a condition suitable for the amount of the travelling load.

Further, the second threshold value TH2 is set to be a value less than the first threshold value TH1, and, therefore, the travelling mode is not frequently switched between the forced fixed mode and the variable mode. Therefore, the travelling hydraulic motor 20 can be operated more stably, and the travelling operability of the excavator can be further improved.

Further, the first threshold value TH1 is set to a relatively large value, and, therefore, the variable mode is not switched to the forced fixed mode simply by making a slight adjustment in the travelling direction.

Figure 8:
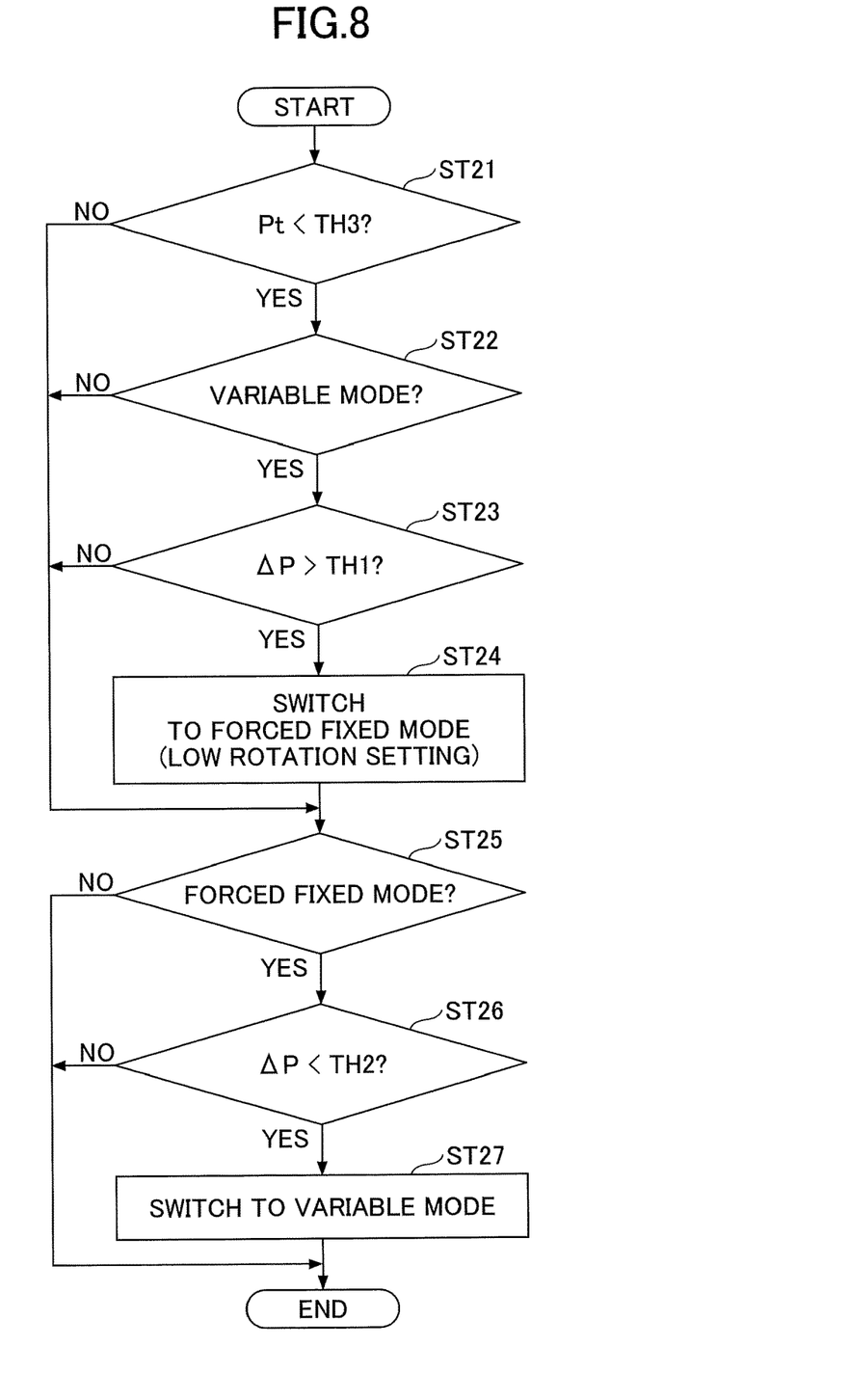
FIG. 8 is another example of a flowchart of a travelling mode switching process.

Next, another example of the travelling mode switching process will be described with reference to FIG. 8. FIG. 8 is another example of a flow chart of a travelling mode switching process, in which the controller 30 repeatedly executes the travelling mode switching process in predetermined control cycles when at least one of the left travelling operation device 26L and the right travelling operation device 26R is operated.

The travelling mode switching process of FIG. 8 differs from the travelling mode switching process of FIG. 5 in that step ST21 is included, and is common in other respects. That is, the steps ST22 to ST27 of FIG. 8 correspond to the steps ST1 to ST6 of FIG. 5. Therefore, descriptions of the common portions are omitted and the differences will be described in detail.

In the travelling mode switching process of FIG. 8, the travelling mode control unit 300 first determines whether the total value Pt (=|PL|+|PR|) of the operation pressure PL detected by the operation pressure sensor 29L and the operation pressure PR detected by the operation pressure sensor 29R is below a threshold value TH3 (step ST21). The threshold value TH3 is a value greater than the first threshold value TH1.

Then, only when it is determined that the total value Pt is less than the threshold value TH3 (YES in step ST21), the travelling mode control unit 300 executes step ST22, and when it is determined that the total value Pt is greater than or equal to the threshold value TH3 (NO in step ST21), the travelling mode control unit 300 does not execute step ST22.

That is, the travelling mode control unit 300 switches the travelling mode only when the total operation amount of the left travelling operation device 26L and the right travelling operation device 26R is relatively small. This is to prevent the motor capacity from being switched to the low rotation setting when travelling at a relatively high speed.

With this configuration, in addition to the effect of the travelling mode switching process illustrated in FIG. 5, the travelling mode switching process illustrated in FIG. 8 has the effect of preventing a rapid drop in the rotation speed of the travelling hydraulic motor 20 caused by switching the travelling mode while travelling at high speed, for example. The controller 30 may, for example, switch the motor capacity to the low rotation setting when the tilt of the travelling operation device is small.

As described above, the controller 30 switches the travelling mode of the motor regulator 50 to a forced fixed mode when a predetermined operation is performed to change the travelling direction of the lower travelling body 1, such as a right turning operation, a left turning operation, a pivot turn operation, a spin turn operation, and the like. The travelling mode is then maintained at the forced fixed mode until the predetermined operation is ended. Therefore, it is possible to prevent the motor capacity of the travelling hydraulic motor 20 from being frequently switched between the low rotation setting and the high rotation setting while a predetermined operation is being performed. As a result, the travelling hydraulic motor 20 can be operated more stably and the excavator can travel more stably.

For example, when the differential pressure ΔP between the operation pressure PL representing the operation amount of the left travelling operation device 26L and the operation pressure PR representing the operation amount of the right travelling operation device 26R, exceeds the first threshold value TH1, the controller 30 determines that a predetermined operation has been performed and switches the motor capacity to the low rotation setting.

After the controller 30 switches the motor capacity to the low rotation setting, when the differential pressure ΔP falls below the second threshold value TH2 that is lower than the first threshold value TH1, the controller 30 may switch the motor capacity of the travelling hydraulic motor 20 back to the original motor capacity.

Further, the controller 30 may switch the motor capacity of the travelling hydraulic motor 20 to the low rotation setting when an operation is performed to change the travelling direction of the lower travelling body 1 in the case where the total value of the operation pressure PL representing the operation amount of the left travelling operation device 26L and the operation pressure PR representing the operation amount of the right travelling operation device 26R, is less than a threshold value.

Alternatively, the controller 30 may, for example, switch the motor capacity of the travelling hydraulic motor 20 to the low rotation setting when the difference between the operation amount of the left travelling operation device 26L and the operation amount of the right travelling operation device 26R exceeds a third threshold value (for example, corresponding to the first threshold value TH1 relating to the differential pressure ΔP; may be referred to as a first threshold value). This is because it can be determined that the lower travelling body 1 is turning. In this case, the operation amount of each of the left travelling operation device 26L and the right travelling operation device 26R may be detected based on the output of, for example, a pressure sensor, an operation angle sensor, an acceleration sensor, an angular velocity sensor, a resolver, a voltmeter or an ammeter, and the like.

After the controller 30 switches the motor capacity of the travelling hydraulic motor 20 to the low rotation setting, when the difference between the operation amount of the left travelling operation device 26L and the operation amount of the right travelling operation device 26R falls below a fourth threshold value (for example, corresponding to the second threshold value TH2 relating to the differential pressure ΔP; may be referred to as a second threshold value) that is lower than the third threshold value, the controller 30 may switch the motor capacity of the travelling hydraulic motor 20 back to the original motor capacity.

The controller 30 may switch the motor capacity of the travelling hydraulic motor 20 to the low rotation setting when an operation to change the travelling direction of the lower travelling body 1 is performed in the case where the total value of the operation amount of the left travelling operation device 26L and the operation amount of the right travelling operation device 26R is less than a threshold value.

The controller 30 may control the motor capacity of the travelling hydraulic motor 20 to be switchable between the low rotation setting and the high rotation setting, and when an operation is performed to change the travelling direction of the lower travelling body 1 when the motor capacity is set to the high rotation setting, the controller 30 may switch the motor capacity to the low rotation setting.

The controller 30 may switch the motor capacity to the low rotation setting, and thereafter, when an operation to change the travelling direction of the lower travelling body 1 is ended, the controller 30 may switch the motor capacity back to the original motor capacity.

The preferred embodiment of the present invention has been described above. However, the present invention is not limited to the embodiments described above. Various modifications, substitutions, and the like may be applied to the above-described embodiments without departing from the scope of the present invention. Each of the features described with reference to the above-described embodiments may also be suitably combined, unless there is a technical inconsistency.

For example, in the above-described embodiment, the controller 30 switches the travelling mode of the motor regulator 50 between the variable mode and the forced fixed mode; however, the controller 30 may switch the travelling mode of the motor regulator 50 between three or more modes.

Further, the travelling hydraulic motor 20 is configured to switch the motor capacity between two stages, namely, the low rotation setting and the high rotation setting; however, the travelling hydraulic motor 20 may switch the motor capacity between three or more stages.

According to one embodiment of the present invention, an excavator that causes a variable displacement type travelling hydraulic motor to operate more stably, can be provided.

The excavator and the method of controlling excavator are not limited to the specific embodiments described in the detailed description, and variations and modifications may be made without departing from the spirit and scope of the present invention.

What is claimed is:

1. An excavator comprising:
   a lower travelling body;
   an upper turning body mounted on the lower travelling body;
   a hydraulic pump installed in the upper turning body;
   a travelling hydraulic motor that is a variable displacement type motor configured to move the lower travelling body by being driven by hydraulic oil discharged by the hydraulic pump; and
   a control device configured to control a motor capacity of the travelling hydraulic motor so as to be switchable between a plurality of levels, wherein
   the control device maintains the motor capacity at a low rotation setting upon detecting that the lower travelling body is curving.

2. The excavator according to claim 1, wherein the control device switches the motor capacity to a high rotation setting upon detecting that a travelling movement of the lower travelling body changes from curving to travelling straight forward.

3. The excavator according to claim 1, wherein the control device switches the motor capacity to the low rotation setting upon detecting that a tilt of a travelling operation device is small.

4. The excavator according to claim 1, wherein the control device determines that the lower travelling body is curving upon detecting that a difference between an operation amount of a left travelling operation device and an operation amount of a right travelling operation device exceeds a threshold value.

5. A method of controlling the excavator as set forth in claim 1, the method comprising:
   maintaining, by the control device, the motor capacity at a low rotation setting upon detecting that the lower travelling body is curving.

6. The method according to claim 5, comprising:
   switching, by the control device, the motor capacity to a high rotation setting upon detecting that a travelling movement of the lower travelling body changes from curving to travelling straight forward.

7. The method according to claim 5, comprising:
   switching, by the control device, the motor capacity to the low rotation setting upon detecting that a tilt of a travelling operation device is small.

8. The method according to claim 5, comprising:
   determining, by the control device, that the lower travelling body is curving upon detecting that a difference between an operation amount of a left travelling operation device and an operation amount of a right travelling operation device exceeds a threshold value.

* * * * *